(12) United States Patent
Gopalakrishnan et al.

(10) Patent No.: US 7,228,132 B2
(45) Date of Patent: Jun. 5, 2007

(54) METHOD AND APPARATUS FOR PROVIDING SERVICE PROFILE UPGRADES WITH MINIMAL DOWNTIME

(75) Inventors: Saikrishnan Gopalakrishnan, San Jose, CA (US); Nachiket J. Deshpande, San Jose, CA (US); Anirban Roy, Sunnyvale, CA (US); Sunil Kumar Chandrupatla, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 40 days.

(21) Appl. No.: 11/157,230

(22) Filed: Jun. 20, 2005

(65) Prior Publication Data

US 2006/0288086 A1 Dec. 21, 2006

(51) Int. Cl.
*H04Q 7/20* (2006.01)
*H04M 3/42* (2006.01)

(52) U.S. Cl. .............................. 455/432.3; 379/201.02
(58) Field of Classification Search ............. 455/432.3, 455/433, 414.1; 379/201.02
See application file for complete search history.

(56) References Cited

U.S. PATENT DOCUMENTS

| 2002/0187775 A1* | 12/2002 | Corrigan et al. ............ 455/414 |
| 2003/0018887 A1* | 1/2003 | Fishman et al. ............ 713/151 |
| 2003/0065778 A1* | 4/2003 | Malik ......................... 709/225 |
| 2004/0064480 A1* | 4/2004 | Bartlett et al. ........... 707/104.1 |

* cited by examiner

*Primary Examiner*—Barry Taylor
(74) *Attorney, Agent, or Firm*—Sierra Patent Group, Ltd.

(57) ABSTRACT

Methods and apparatus are disclosed for dynamically updating service profiles in a network system. A device, such as an edge device providing network services to subscribers, is configured to dynamically update profiles for services provided to subscribers with no downtime required. Devices may be configured in accordance with this disclosure to receive a request by a first subscriber to access a network service having an associated service profile. The device may then cache the current version of the service profile into memory. Upon receiving a request from a second subscriber to access the same network service, the device may then determine whether a newer version of the service profile exists. If a newer version exists, then the device may then associate the newer version of the service profile to the second subscriber's session. Older versions may be purged as they are no longer used.

20 Claims, 4 Drawing Sheets

METHOD AND APPARATUS FOR PROVIDING SERVICE PROFILE UPGRADES WITH MINIMAL DOWNTIME

BACKGROUND

1. Field of the Disclosure

The disclosure relates generally to the service providers of data communications, and in particular, to the upgrading of service profiles for network subscribers.

2. The Prior Art

Background

Edge services provided to subscribers can take the form of basic Internet access through DSL, cable access and the likes, or more specific services such as secure access to corporate Intranets. Users typically are provided the services through an "Edge" device, usually a router coupled between the subscriber and the Internet that is configured to provide gateway services.

In operation, each subscriber has an associated subscriber profile maintained by the service provider that indicates which of the many offered services a particular subscriber is entitled to access.

When a subscriber begins a new session, typically the edge device accesses a AAA server to authenticate the subscriber's profile, and then loads the subscriber's profile into a cache memory located in the edge device. The subscriber is then presented with the authenticated services in the form of a dashboard or home page that includes indications of what services have been authorized for the subscriber's account. When the subscriber selects a particular service, a service selection request is then sent from the edge device to the AAA server for authentication, and a subscriber service profile is returned to the edge device for storage locally.

In providing the service profile to the edge device, the service profile also enables the edge device to be configured to provide the service. For example, routing paths, secure tunnels, and gateway configuration parameters may be uploaded to the edge device as a result of a service request from the subscriber.

Overall policies exist to further define and authenticate a session associated with a particular subscriber. When a subscriber requests access to a given feature, the subscriber's session activates service profile associated with the new service. The services can then activate flows associated with their particular traffic requirements. Thus each session can have many activated services associated with the user, and each service can have respective flows, all being managed by the subscriber's particular session.

As will be appreciated by those of ordinary skill in the art, many subscribers will access many of the same service offered by the service provider. To reduce overhead, typically the policies and profiles associated with a particular service are then cached by the edge device the first time accessed by a subscriber, and these cached profiles are retrieved locally when subsequent subscribers request the same service.

A problem presents itself when a profile provided by the service provider needs to be upgraded. For example, the profile of an Intranet secure access service may be needed to be upgraded in light of newly-discovered security threats. If a service provider has many sessions active that are using a particular service that is in need of an update, each session would need to be brought down and re-started with the updated service profile.

In prior art systems, the service profile is updated off-line from the edge box, i.e., on the AAA server and 'pushed' to the edge server. At a scheduled downtime, all sessions are taken down and updated. Alternatively, the service profiles may be simply pushed and overlayed on active sessions that have services that need to be updated, in an attempt to update the services in real-time. However, if service attributes are changed, many active sessions may be left in unstable states, causing problems for subscribers.

As will be appreciated, this forced updating in the prior art will necessarily interrupt service for the subscribers who are currently using the services. Hence, there is a need for a procedure to update services without interrupting a subscriber's experience or requiring scheduled downtime.

BRIEF DESCRIPTION OF THE DRAWING FIGURES

DETAILED DESCRIPTION

Figure 1:
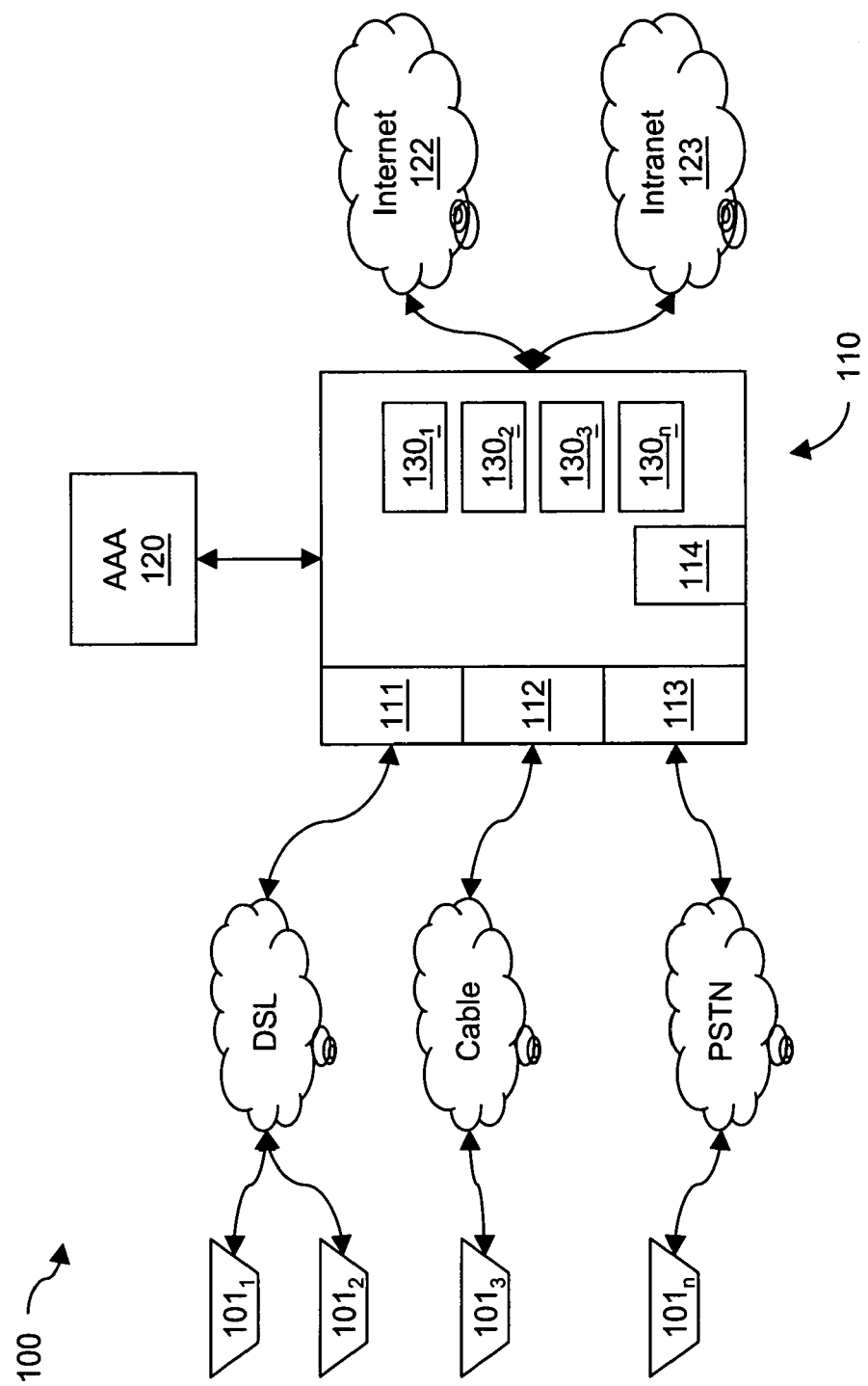
FIG. 1 is a block diagram of a system configured to upgrade service profiles without subscriber downtime in accordance with the teachings of this disclosure.

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

This disclosure may relate to data communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media, and may be configured to be accessible by a machine as is known in the art.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein.

Accordingly, the representation of various aspects of the present disclosure through the use of flowcharts should not be used to limit the scope of the present disclosure.

The present disclosure provides for dynamically updating service profiles with no downtime. Service profiles are cached on the edge device and assigned to new sessions as requested. When an updated service profile is available, it is assigned to the next session accessing the service, and the updated profile is also cached on the server. However, pre-existing sessions operating using the previous version of the service profile are allowed to remain active and are not updated. I.e., they are allowed to operate using the previous version. When no more sessions are active under an older version, the older version's profile is then removed from the cache.

Using the benefits of this disclosure, new sessions are always activated using the newest version of a service profile available. If a session needs to re-activate a particular session, it will always be pointed to the version of the service profile that existed when the session was activated. When the subscriber's session has ended, the subscriber will be provided with updated versions the next time the subscriber activates a new session. Thus at any point in time, many different versions of a particular service profile may be active, with subscribers being updated as they close active sessions.

FIG. 1 is a block diagram of a system 100 configured to upgrade service profiles without subscriber downtime in accordance with the teachings of this disclosure. The system 100 of FIG. 1 includes an edge device 110 including processor and associated memory 114 configured to perform embodiments of this disclosure. The edge device 110 serves as the primary interface between the host service provider and the subscribers $101_1 \ldots 101_n$.

It is contemplated that the edge device 110 is configured to provide a wide array of gateway services, as illustrated by DSL interface 111, cable interface 112, and a gateway for the Public Switched Telephone Network (PSTN) 113. Other interfaces are possible depending on the types of services offered by the provider.

To manage subscriber accounts, a AAA server 120 is provided. As is known in the art, a AAA Server is a server or servers that provide authentication, authorization and accounting services. These may be co-located with the edge device 110, or more typically, are located on a separate server and communicate with the edge device's interface via an AAA protocol. The AAA functions may be located on a single server, or may be broken up among multiple servers.

In operation, when a subscriber desires to access a service, such as the Internet 122 or a corporate Intranet 123, a service profile 130 is cached from the AAA server 120 to the edge device 110. Thus, as a particular service is accessed, a corresponding service profile $130_1 \ldots 130_n$ is cached for each service active on the edge device 110.

Figure 2:
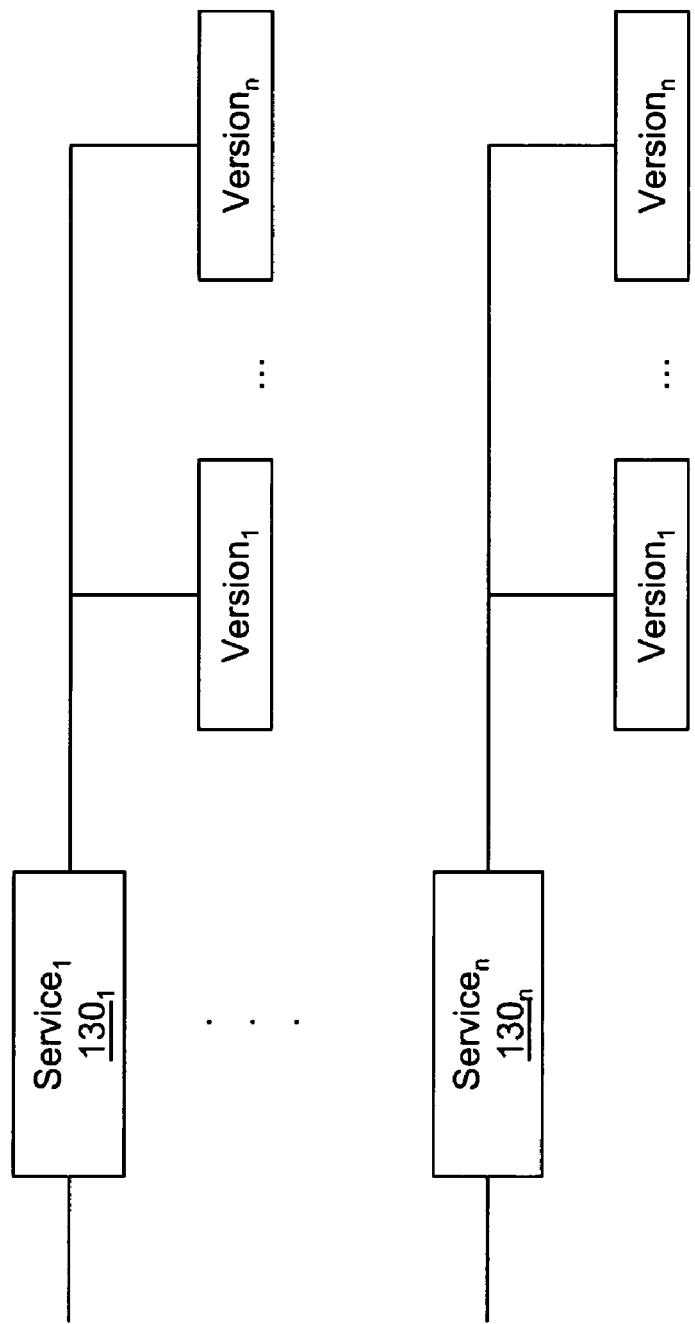
FIG. 2 is a conceptual block diagram illustrating how multiple versions of service profiles may be cached in accordance with the teachings of this disclosure.

FIG. 2 is a conceptual block diagram illustrating how multiple versions of service profiles may be cached in accordance with the teachings of this disclosure. FIG. 2 shows service profiles $130_1 \ldots _n$ cached, each with versions 1 . . . n associated therewith. Methods for managing the service profiles and associated versions will now be disclosed.

Figure 3:
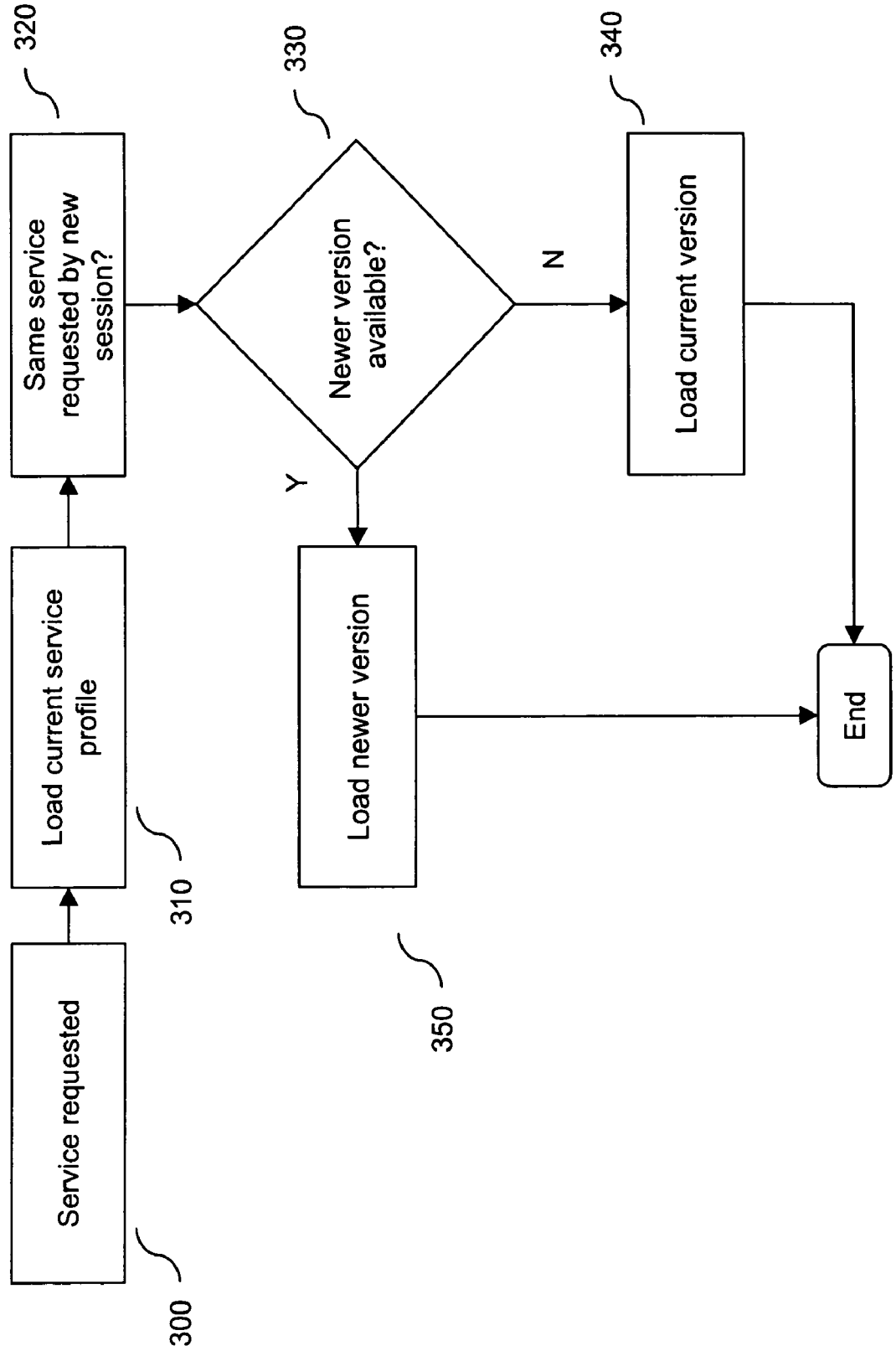
FIG. 3 is a flow diagram for dynamically managing versions of service profiles in accordance with the teachings of this disclosure.

FIG. 3 is a flowchart for dynamically managing versions of service profiles in accordance with the teachings of this disclosure. The process begins in act 300, where a particular service is requested by a subscriber. This step assumes that the service is being requested for the first time, and no previous version of the service profile has been cached. In such a case, the current version of the service profile will be cached on the edge device in act 310.

Once a version has been cached, the process moves to query 320, where a new session has requested the same service as that of act 300. In this case, the process moves to query 330, where it is determined whether a newer version of the service profile exists than the version in use by previous sessions. If no newer version exists, the current version is associated with the new session in act 340, and the process returns to the query 330 to await the next request.

However, if a new version has been found, then the new session will be associated with the newer version of the service profile in act 350. The process then awaits the next request.

It is contemplated that as a result of the process of FIG. 3, the edge device will maintain a registry, such as a database, comprising groups of active sessions their particular version of a service profile. As new service profiles are available, the new versions may be published or pushed to the edge device, and the edge device will then deploy the new versions responsive to subsequent service requests according to the process of FIG. 3.

Figure 4:
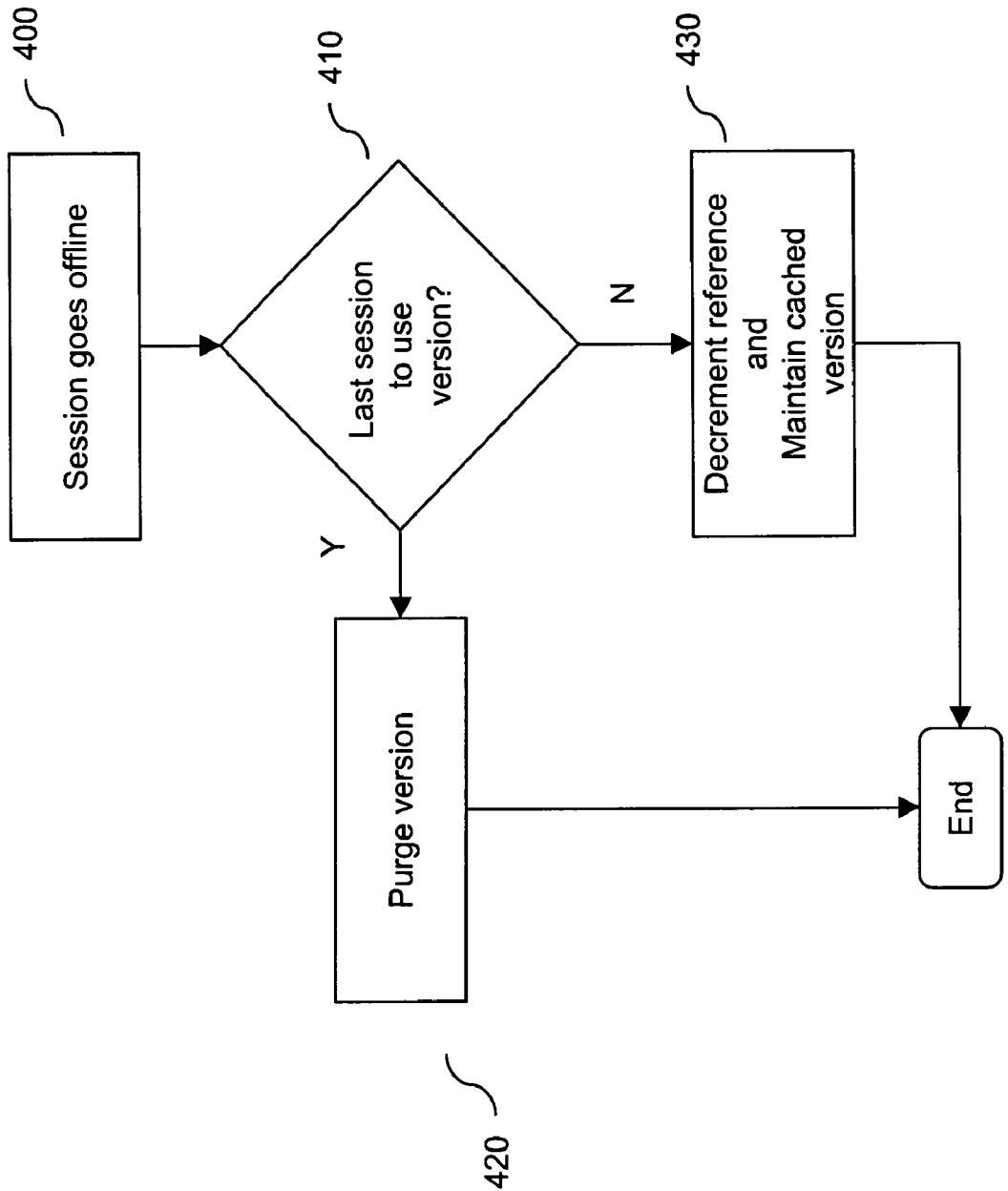
FIG. 4 is a flow diagram illustrating how older versions of service profiles may be retired and purged in accordance with the teachings of this disclosure.

FIG. 4 is a flow diagram illustrating how older versions of service profiles may be retired and purged in accordance with the teachings of this disclosure. The process of FIG. 4 begins in act 400, where a subscriber's session goes offline. It is contemplated that this may occur when a subscriber logs out or otherwise goes offline, or their session times out after a period of inactivity.

When a particular session goes offline, the process then moves to query 410, where the services associated with the session are examined to determine if this session is the last session to utilize a particular version of a service profile. If this session was the last to use a particular version, then there is no longer a need to maintain this version and it may be purged in act 420.

However, if there exists other active sessions that also utilize this version, then the version is maintained in the cached in act 430. In a preferred embodiment, the reference designation to the version is decremented and the version is maintained in cache.

As will now be appreciated, the process of FIGS. 3 and 4 together illustrate a dynamic process for launching new sessions with the newest available version of a service profile, while providing a process to retire older versions as sessions go offline. The next time a user initiates a new session (i.e., the next time a user logs on or goes online), the subscriber's new session will be launched with the latest version of a given service profile.

Thus, the processes of FIGS. 3 and 4 disclose a dynamic method for continuously updating service profile versions in a sequential and timely fashion. For the time that a version is current, all new sessions are instantiated using the current version. When a new version becomes available, all future sessions are launched using the newer version until yet a new version is available. Meanwhile, when a particular version is no longer associated with an active session, the older version may then be purged.

Therefore as a result of the benefits of this disclosure, new sessions are always launched with the newest version of service profiles available, while older sessions are allowed to utilize previous versions until the sessions are brought down in a graceful manner. Newer versions are therefore provided to the system without all current sessions being brought down through scheduled downtimes as in system of the prior art.

It is contemplated that while a particular session is active, a subscriber may re-access a service, perhaps as a result of re-launching their browser or re-accessing an Intranet during the same session. In this case, it is desired not to provide the subscriber with a newer version of a service profile that has been upgraded since their session has been active. In accordance with this disclosure, when a subscriber attempts to re-initialize a service that has been upgraded while their session has been active, the system will associate the version of the service profile that was active when the session was launched.

As will be appreciated, by maintaining a session with a consistent version of the service profile, stability of sessions may be ensured as newer versions of service profiles may include changes in parameters that may induce erratic or unpredictable behavior in sessions launched with previous versions. Hence, it is contemplated that sessions will be associated only with the version of a service profile that was current when the session was launched for the duration of the session.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. A method for dynamically updating service profiles in a network system comprising:
   receiving a request by a first subscriber to access a network service having an associated service profile wherein said associated service profile is a first version of said associated service profile;
   retrieving said associated service profile for said network service;
   caching said associated service profile;
   associating said associated service profile for said network service with said first subscriber;
   receiving a request from a second subscriber to access said network service;
   determining whether a second version of said service profile exists for network service wherein said second version is newer than said first version in use by said first subscriber;
   retrieving said second version of said service profile;
   associating said second version of the service profile to said second subscriber responsive to a determination that a newer version exists; and
   removing said first version from said cache responsive to all users associated with said first version of said service profile are no longer using said network service.

2. The method of claim 1, further comprising the act of maintaining a registry of active sessions associated with subscribers, and the versions of service profiles associated with the active sessions.

3. The method of claim 2, further comprising receiving a new version of a service profile, and associating the new version with subsequent requests.

4. The method of claim 3, further comprising the act of purging a version of a service profile that is no longer in use.

5. The method of claim 4, where services are re-launched with the same version of a service profile for the duration of a session.

6. An apparatus for dynamically updating service profiles in a network system comprising:
   means for receiving a request by a first subscriber to access a network service having an associated service profile wherein said associated service profile is a first version of said associated service profile;
   means for retrieving said associated service profile for said network service;
   means for caching said associated service profile;
   means for associating said associated service profile for said network service with said first subscriber;
   means for receiving a request from a second subscriber to access said network service;
   means for determining whether a second version of said service profile exists for network service wherein said second version is newer than said first version in use by said first subscriber;
   means for retrieving said second version of said service profile;
   means for associating said second version of the service profile to said second subscriber responsive to a determination that a newer version exists; and
   means for removing said first version from said cache responsive to all users associated with said first version of said service profile are no longer using said network service.

7. The apparatus of claim 6, further comprising means for maintaining a registry of active sessions associated with subscribers, and the versions of service profiles associated with the active sessions.

8. The apparatus of claim 7, further comprising means for receiving a new version of a service profile, and associating the new version with subsequent requests.

9. The apparatus of claim 8, further comprising means for purging a version of a service profile that is no longer in use.

10. The apparatus of claim 9, where means for re-launching a service with the same version of a service profile for the duration of a session.

11. An edge device for dynamically updating service profiles in a network system comprising:
    an edge device including a processor and memory configured to:
      receive a request by a first subscriber to access a network service having an associated service profile wherein said associated service profile is a first version of said associated service profile;
      retrieve said associated service profile for said network service:
      caching said associated service profile;
      associate said associated service profile for said network service with said first subscriber;
      receive a request from a second subscriber to access said network service;
      determine whether a second version of said service profile exists for network service wherein said second version is newer than said first version in use by said first subscriber;
      retrieve said second version of said service profile;
      associate said second version of the service profile to said second subscriber responsive to a determination that a newer version exists; and
      remove said first version from said cache responsive to all users associated with said first version of said service profile are no longer using said network service.

12. The edge device of claim 11, further configured to maintain a registry of active sessions associated with subscribers, and the versions of service profiles associated with the active sessions.

13. The edge device of claim 12, further configured to receive a new version of a service profile, and associating the new version with subsequent requests.

14. The edge device of claim 13, further configured to purge a version of a service profile that is no longer in use.

15. The edge device of claim 14, where services are re-launched with the same version of a service profile for the duration of a session.

16. A computer-readable device containing a set of instructions for causing a computer to perform a method for dynamically updating service profiles in a network system, the method comprising:

receiving a request by a first subscriber to access a network service having an associated service profile wherein said associated service profile is a first version of said associated service profile;

retrieving said associated service profile for said network service;

caching said associated service profile;

associating said associated service profile for said network service with said first subscriber;

receiving a request from a second subscriber to access said network service;

determining whether a second version of said service profile exists for network service wherein said second version is newer than said first version in use by said first subscriber;

retrieving said second version of said service profile;

associating said second version of the service profile to said second subscriber responsive to a determination that a newer version exists; and removing said first version from said cache responsive to all users associated with said first version of said service profile are no longer using said network service.

17. The device of claim 16, said method further comprising the act of maintaining a registry of active sessions associated with subscribers, and the versions of service profiles associated with the active sessions.

18. The device of claim 17, said method further comprising receiving a new version of a service profile, and associating the new version with subsequent requests.

19. The device of claim 18, said method further comprising the act of purging a version of a service profile that is no longer in use.

20. The device of claim 19, said method further comprising re-launching services with the same version of a service profile for the duration of a session.

* * * * *